United States Patent [19]

Nickerson et al.

[11] 4,058,328

[45] Nov. 15, 1977

[54] HEAT-RESPONSIVELY SELF-SEALING PROTECTIVE JACKET FOR EXPANSION JOINTS

[75] Inventors: Harvey R. Nickerson, Roseland; Helm A. Rink, North Haledon; John K. Menzel, Orange, all of N.J.

[73] Assignee: Resistoflex Corporation, Roseland, N.J.

[21] Appl. No.: 736,778

[22] Filed: Oct. 29, 1976

[51] Int. Cl.² .............................................. F16L 11/12
[52] U.S. Cl. ......................................... 285/45; 169/48
[58] Field of Search ................... 285/45, 47, 226, 236, 285/117, 419, 373, 114, 53, 187; 169/57, 48

[56] References Cited

U.S. PATENT DOCUMENTS

| | | | |
|---|---|---|---|
| 1,459,126 | 6/1923 | Widiger | 285/47 |
| 1,699,244 | 1/1929 | Lewis | 169/57 |
| 1,896,225 | 2/1933 | Dyer | 285/45 |
| 2,708,123 | 5/1955 | Risley et al. | 285/45 |
| 2,713,503 | 7/1955 | Ekholm | 285/226 X |
| 2,886,885 | 5/1959 | Reid | 285/226 X |
| 3,837,685 | 9/1974 | Miller | 285/45 |
| 3,995,102 | 11/1976 | Kohaut | 169/48 |

Primary Examiner—Wayne L. Shedd
Attorney, Agent, or Firm—Watson, Leavenworth, Kelton & Taggart

[57] ABSTRACT

An expansion joint having a working element of polytetrafluoroethylene is protected from fire by jacketing with an enclosure of refractory material. The jacket has openings through which pipe passes to and from the joint. A gland is inserted within the openings around the pipe for closing most of the gap therebetween while affording sufficient freedom of movement not to interfere with motion of the joint. Each gland is formed from a metal ring, channel shaped, coated on all surfaces with an intumescent material which expands in a fire to seal all remaining gaps between the pipe and the encircling opening in the jacket whereby hot gases are barred from passage. Alternatively, where radial movement is not required, the intumescent material may be coated directly on the refractory material around the opening surrounding the pipe. The principles of the gland and the use of the intumescent material may be applied wherever a fire stop and a thermal barrier are required in the space between two relatively movable non-combustible elements.

10 Claims, 6 Drawing Figures

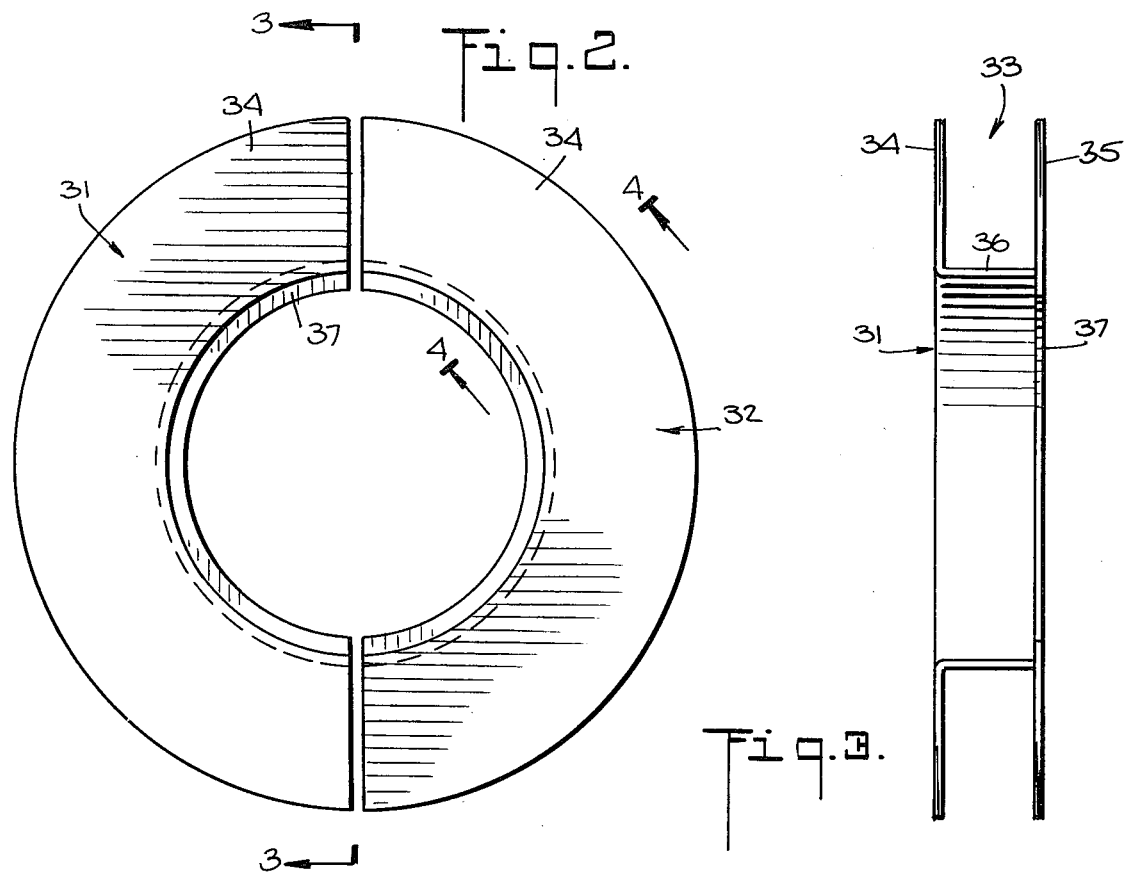
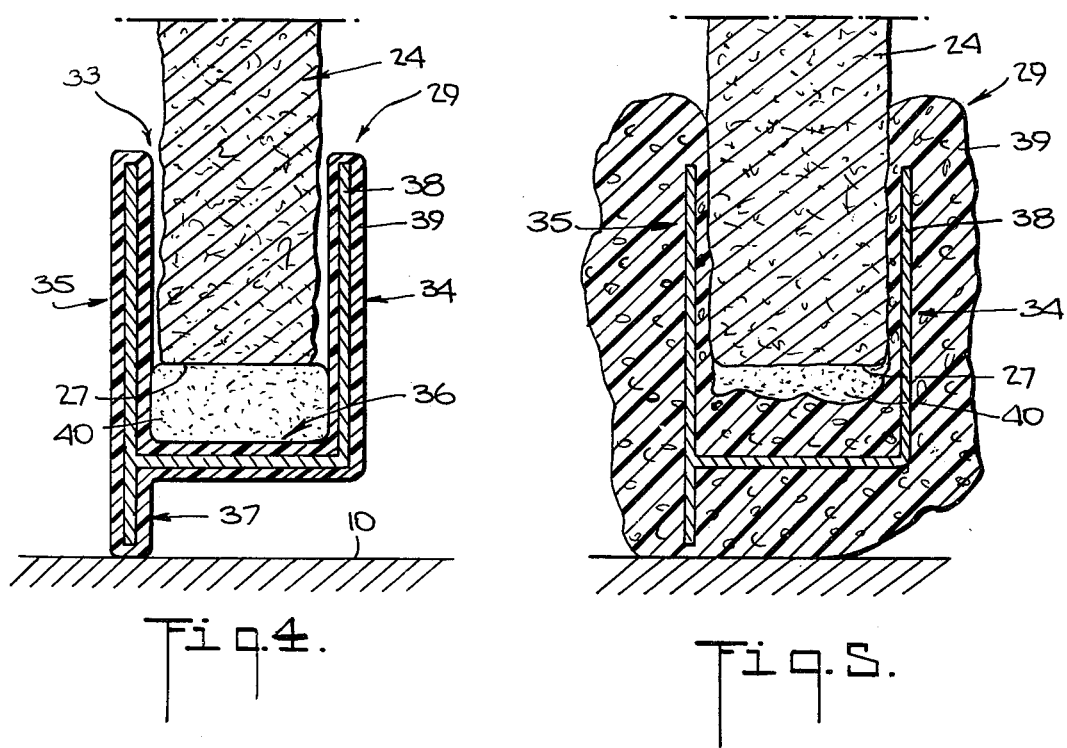

HEAT-RESPONSIVELY SELF-SEALING PROTECTIVE JACKET FOR EXPANSION JOINTS

The present invention relates to fireproofing. More particularly, the invention relates to apparatus for providing a fire stop and thermal barrier whereby heat softenable plastic materials can be protected for extended periods of time from the direct onslaught of a fire.

There are many situations in which fluid piping is employed to convey fluids which constitute a potential hazard either because they are flammable, toxic, or otherwise susceptible of contaminating the environment. Safe containment of such fluids contemplates that the piping system will, among other characteristics, be fireproof.

From the standpoint of corrosion resistance, it is often dictated that the piping, e.g., steel pipe, be lined with polytetrafluoroethylene resin (hereinafter abbreviated PTFE). In U.S. Pat. application No. 577,849, filed May 15, 1975, by Irving D. Press, Helm A. Rink, and Harvey R. Nickerson for "Fire-Safe Jacket for Fluid Piping Components" there is described and claimed a system for protecting the fittings, joints and valves of such piping. As disclosed in said application, fireproofing is accomplished by jacketing the components with an enclosure formed from fibrous refractory material. The enclosures are configured and dimensioned to contain a substantially fixed air volume within a predetermined air gap space between the exterior of the component and the interior of the jacket. The various configurations illustrated and described in said pending application are all intended to cooperate with inflexible nonmovable piping components. However, piping systems often require expansion or flexible joints or both. Such joints have been available heretofore although not in a fireproof embodiment.

The problem in protecting a flexible or expansion joint having a PTFE working element is that the element is directly exposed on its exterior to the surrounding environment and any satisfactory fireproofing enclosure must exclude heat as well as flame or the PTFE element will fail quickly. But since the joint must be free to flex or otherwise move any enclosure must not interfere therewith. This particular problem is solved by the present invention although the scope of the invention, as will appear from the ensuing description, is of greater breadth.

In accordance with one aspect of the present invention, there is provided a fire-safe jacket for protecting a joint of the type mentioned above with jacket comprises a plurality of segments of refractory material joinable around said joint to form an enclosure thereabout with an air gap between the exterior of said joint and the interior of said enclosure. The segments are so configured and dimensioned as to provide when assembled a respective opening through which adjacent piping components pass to and from the joint. The respective openings each have a diameter greater than the outside diameter of the corresponding adjacent piping component, and a gland in the form of a ring covered with a layer of intumescent material is inserted within each of said respective openings for substantially bridging the radial gap between said opening and said corresponding adjacent piping component passing therethrough, while said ring makes a sliding fit with the latter.

As a further aspect of the present invention, a gland is provided for installation between two relatively movable non-combustible elements for providing both a fire stop and a thermal barrier in the space therebetween. The gland comprises a core structure of non-combustible material coated with a layer of intumescent material and normally movable relative to one of said elements with a predetermined clearance therebetween. The intumescent material is expandable when exposed to the heat of a fire for filling the spaced between said core structure and said respective relatively movable elements to bar the passage of flame and hot gases and impede the passage of heat therethrough.

The invention will be better understood after reading the following detailed description of the preferred embodiments thereof with reference to the appended drawings in which:

FIG. 3 is a view taken along the line 3—3 in FIG. 2;

FIG. 4 is a sectional view, greatly enlarged, taken along line 4—4 in FIG. 2;

FIG. 5 is a view similar to FIG. 4 showing the expansion of the intumescent material when exposed to fire; and FIG. 6 is a fragmentary view showing a modification of the embodiment of FIG. 1.

Reference should now be had to the drawings wherein the same reference numerals are used throughout to designate the same or similar parts.

Figure 1:
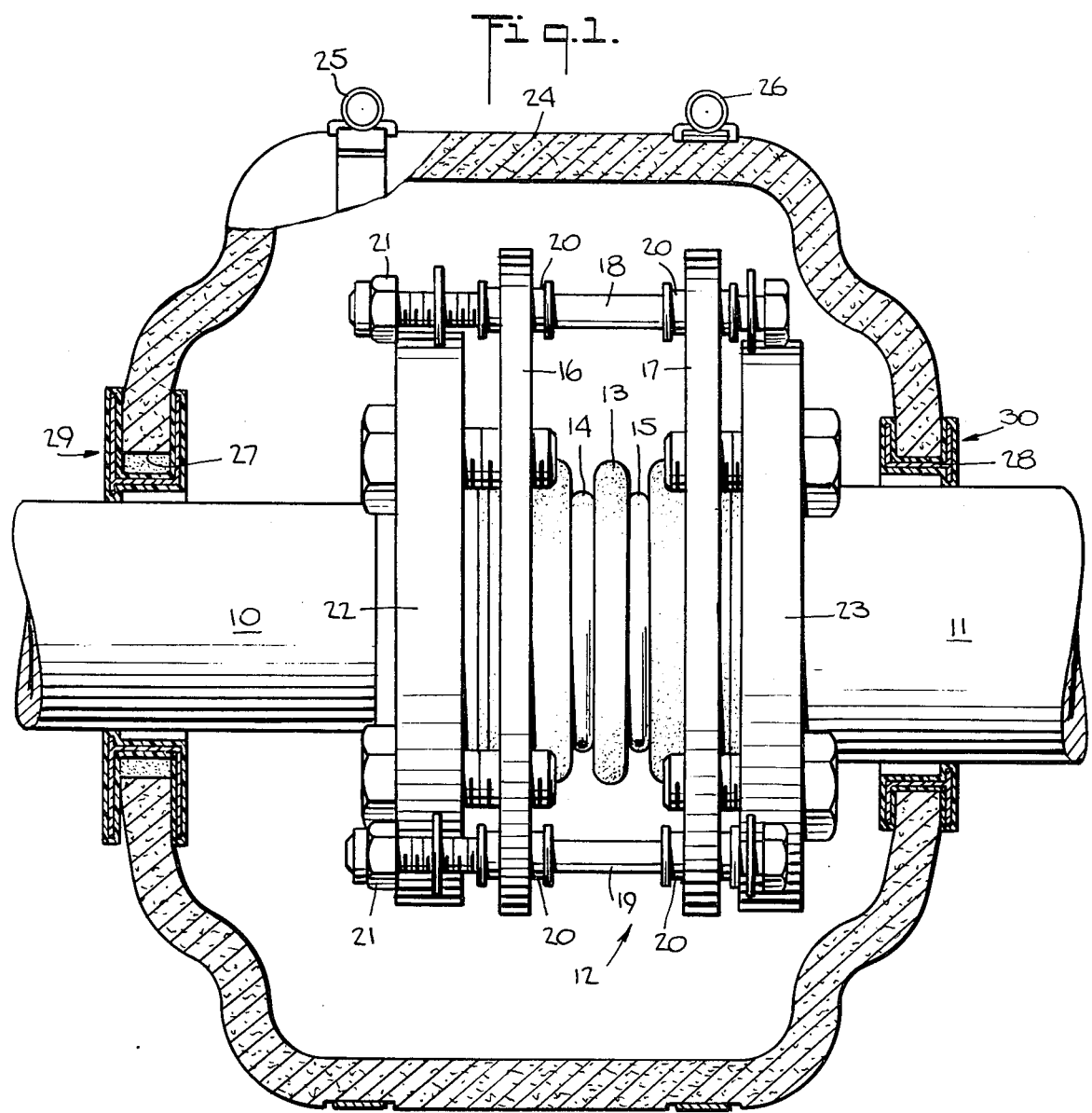
FIG. 1 is an elevational view partly in section and partially broken away showing the fire-safe jacket assembled around a flexible expansion joint.

As shown in FIG. 1, flanged pipes 10 and 11 are interconnected by a flexible expansion joint 12. The pipes 10 and 11 are formed of steel and lined with PTFE, a plastic material having a high temperature rating but, nevertheless, heat softenable. For purpose of illustration, the joint 12 is shown as having a flexible corrugated fluid carrying portion or working element 13 of PTFE reinforced with metal rings 14 and 15 resting within the valleys of the corrugations in the plastic. The working element 13 joins a pair of flanges 16 and 17 which are interconnected with motion limiting connectors of which two, designated by the reference characters 18 and 19, are shown. Each connector is in the form of a bolt passing through rubber grommets 20 and secured by a locknut 21. The joint flanges 16 and 17 are interconnected, respectively, with flanges 22 and 23 of pipes 10 and 11. The joint 12 forms no part of the present invenrtion and need not be described further.

An expansion joint of the type illustrated in FIG. 1, presently marketed by the assignee of the subject invention, is rated in the 2" size for a maximum travel in the axial direction of + or − three-fourths of an inch and maximum misalignment at neutral length with limit bolts in place of three-eighth inches. The joint is designed for operation over a temperature range of 50° to 450° F. (10° to 232° C.) depending upon the maximum working pressure. The angular deflection of which such joints are capable is approximately 14°.

The fire-safe jacket for protecting the joint 12 is designated generally by the reference numeral 24. While it is not illustrated in the drawings, the jackets 24 consists of a plurality of segments, preferably two, of refractory material which are joined around the joint to form an enclosure thereabouts. A refractory cement may be applied to the seams, if desired, prior to uniting the segments, and strap clamps such as shown at 25 and 26 are secured thereabout to ensure that the segments do not separate.

The individual segments of the jacket 24 may be constructed as described in the aforesaid pending application. As described therein, high-alumina ceramic fiber mixed with a suitable binder is vacuum formed and then surface coated with an epoxy enamel to produce the segments. The segments are reinforced with a metallic skeletal structure preferably of steel and preferably formed by an expanded metal process, although any other suitable fireproof skeletal structure may be employed. However, unlike the segments described in said pending application, the reinforcement in the segments described herein may extend throughout the refractory material and need not stop short of the margins of the openings 27 and 28. As is explained in said pending application, the segments may be formed from any fibrous material capable of withstanding a flame temperature in excess of 1200° F. (649° C.)

The openings 27 and 28 in the refractory jacket 24 each have a diameter greater than the outside diameter of the corresponding piping components 10 and 11 passing therethrough. For purpose of illustration in FIG. 1, the piping component 11 is shown as having a larger diameter than the piping component 10.

Glands 29 and 30 are inserted within each of the openings 27 and 28, as shown in FIG. 1, for substantially bridging the radial gap between the respective opening and the corresponding underlying piping component 10 and 11, respectively.

Figure 2:
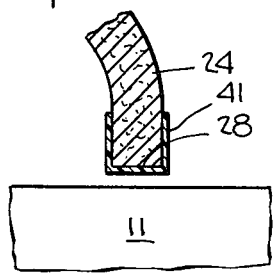
FIG. 2 is a plan view of a gland element constructed in accordance with the present invention.

Referring specifically to FIGS. 2, 3, and 4, there is shown the gland 29 which consists of two halves 31 and 32 to enable the gland to be assembled around the pipe such as the pipe 10. When assembled, the gland has a radially outwardly facing annular channel 33 bounded by substantially parallel spaced apart radial walls 34 and 35 and a bottom wall 36. The spacing between the radial walls 34 and 35 is such as to receive the segments of jacket 24 therebetween with a close fit. A relatively thin flange extends radially inwardly from the bottom wall 36 at one side.

As best seen in FIG. 4, the gland consists of a core structure 38 of non-combustible material, e.g., metal, coated on all surfaces with a layer 39 of intumescent material. As shown in both FIGS. 1 and 4, the thin flange 37 has an inside diameter which approaches close to the outer diameter of the underlying pipe portion such as 10. There should only be sufficient clearance between the flange 37 and the pipe 10 to permit relative axially movement and a slight amount of cocking or canting. It should now be evident that the thin flange 37 minimizes any contact between the gland or ring 29 and the corresponding piping component passing therethrough.

As shown, the gland or ring 29 is provided with a layer 40 of foamed elastomeric material in its channel 33 adjacent its bottom wall 36. As seen in FIG. 4, the elastomeric material 40 fills the space between the bottom wall 36 of the gland 29 and the opening 27 in the jacket 24. However, the elastomeric material 40 is sufficiently compressible and deformable to permit the gland 29 to shift radially relative to the jacket 24. That is, the elastomeric material permits relative radially movement between the ring 29 and the surrounding segments of jacket 24, while closing the gap between the refractory material of the jacket and the bottom wall 36 of the ring. Thus, even though there is minimum clearance between the ring 29 and the pipe portion 10, the relative motion afforded by the elastomeric material 40 is sufficient to accommodate displacement or angular movement of the joint 12 under normal operating conditions.

The gland 30 is essentially the same as the gland 29 except that it is not provided with a layer of foamed elastomeric material, is somewhat differently dimensioned as a consequence, and is sized to fit on the larger pipe portion 11. It has been found sufficient to include elastomeric material in only one of the glands in order to afford the necessary angular freedom. If additional freedom is required, of course, it would be permissible to include elastomeric material in the second gland.

If a fire should erupt within the vicinity of the jacket 24, in the absence of the intumescent material, hot gases would pass rapidly through the clearance between the flange 37 and the unerlying pipe portion to the interior of the jacket sufficiently to destroy the plastic material of the joint 12. Fortunately, the intumescent material rapidly chars and expands assuming proportions somewhat as shown in FIG. 5. By so doing, it rapidly seals the gaps between the underlying pipe portion and the refractory material of the jacket 24, such that hot gases cannot pass through the gland area. This occurs even though the elastomeric layer 40 chars and disintegrates. It has been found that the expansion of the intumescent layer is sufficient to overcome the void created by the disintegration of the elastomeric material. Moreover, the charred intumescent material functions as a thermal barrier of comparable efficiency to the refractory material of the main jacket 24 such that the heat from the fire is kept from the operative element 13 of the joint 12.

In a typical installation the elastomeric layer 40 for a 2 inch pipe joint may have a thickness of approximately five-sixteenth inch, For a 8 inch joint a seven-sixteenth inch thick elastomeric layer should be sufficient.

It is presently preferred to employ as the intumescent material a two part high solid, thixotropic catalyzed epoxy resin system presently marketed by Avco Systems Division of Lowell, Massachusetts under their designation "FLAMAREST 1600 thermal insulating coating", although satisfactory results also have been obtained with their "CHARTEK 59 coating" described as a filling amine-cured epoxy containing flame retardants.

While the intumescent material is preferably applied to a core structure or ring as described above, under certain circumstances the ring may be omitted and the intumescent material applied directly to the refractory material. Thus, as shown in FIG. 6, the gland 30 has been replaced by a layer of intumescent material 41 applied directly to the margins of the opening 28 in the refractory material 24. It should be apparent that the intumescent material 41 is supported in the space between the two relatively movable non-combustible elements 11 and 24 on one of the elements, namely, the refractory jacket 24. The layer 41 is normally movable relative to the other element, pipe 11, with a predetermined clearance therebetween as shown in the drawings. The intumescent material is expandable when exposed to the heat of a fire for filling the clearance between the opening 28 and the pipe 11 to bar the passage of flame and hot gases and impede the pipe 11 to bar the passage of flame and hot gases and impede the passage of heat therethrough.

Having described the presently preferred embodiments of the subject invention, it should be apparent that various changes may be made therein without departing from the true spirit of the invention as defined in the appended claims.

What is claimed is:

1. A fire-safe jacket for protecting a joint in a fluid piping system which joint is capable of expanding or flexing or both, said jacket comprising a plurality of segments of refractory material joinable around said joint to form an enclosure thereabout with an air gap between the exterior of said joint and the interior of said enclosure, said segments being so configured and dimensioned as to provide when assembled a respective opening through which adjacent piping components pass to and from said joint, said respective openings each having a diameter greater than the outside diameter of said corresponding adjacent piping component, and a gland in the form of a ring covered with a layer of intumescent material inserted within each of said respective openings for substantially bridging the radial gap between said opening and said corresponding adjacent piping component passing therethrough, said ring making a sliding fit with the latter.

2. A fire-safe jacket according to claim 1, wherein said rings each comprise a radially outwardly facing annular channel bounded by substantially parallel spaced apart radial walls and a bottom wall, the spacing between said radial walls being such as to receive said segments of refractory material therebetween with a close fit, and a relatively thin flange extending radially inwardly from said bottom wall for minimizing any contact between said ring and said corresponding adjacent piping component passing therethrough.

3. A fire-safe jacket according to claim 2, wherein at least one of said rings is provided with a layer of foamed elastomeric material in its channel adjacent its bottom wall for permitting relative radial movement between the ring and the surrounding segments of refractory material while closing the gap between said refractory material and the bottom wall of said ring.

4. A fire-safe jacket according to claim 3, wherein said intumescent material is a filled epoxy resin system.

5. A fire-safe flexible pipe joint comprising a flexible fluid carrying element formed from a heat softenable plastic material, a jacket surrounding said element with an air gap between the exterior of said element and the interior of said jacket, said jacekt being formed from refractory material and having openings through which piping portions pass to and from said flexible element, non-combustible rings interposed between said piping portions and said openings in said jacket and movable relative to said piping portions sufficient to accommodate motion of said fluid carrying element, and means operative when exposed to heat from an external fire for developing an effective heat seal between said jacket and said piping portions.

6. A fire-safe flexible pipe joint according to claim 5, wherein said means comprises a layer of intumescent material on said rings which expands when exposed to the heat of a fire and fills the gaps between said rings and said pipe portions and said rings and said jacket effectively to bar flow of hot gases into the closed space formed by said jacket.

7. A fire-safe flexible pipe joint according to claim 6, wherein said intumescent material is a filled epoxy resin system.

8. A gland for installation between two relatively movable non-combustible elememts for providing both a fire stop and a thermal barrier in the space therebetween, said gland comprising a core structure of non-combustible material coated with a layer of intumescent material and normally movable relative to one of said elements with a predetermined clearance therebetween, said intumescent material being expandable when exposed to the heat of a fire for filling the spaces between said core structure and said respective relatively movable elements to bar the passage of flame and hot gases and impede the passage of heat therethrough.

9. A gland according to claim 8, wherin said intumescent material is a filled epoxy resin system.

10. An arrangement for providing both a fire stop and a thermal barrier in the space between two relatively movable non-combustible elements comprising a layer of intumescent material supported in said space on one of said elements and normally movable relative to the other of said elements with a predetermined clearance therebetween, said intumescent material being expandable when exposed to the heat of a fire for filling said clearance to bar the passage of flame and hot gases and impede the passage of heat therethrough.

* * * * *

UNITED STATES PATENT OFFICE
CERTIFICATE OF CORRECTION

PATENT NO. 4,058,328
DATED : November 15, 1977
INVENTOR(S) : Nickerson et al.

It is certified that error appears in the above-identified patent and that said Letters Patent are hereby corrected as shown below:

Col. 1, line 53, "with" should read --which--. Col. 2, line 10, "spaced" should read --spaces--; line 15, before "preferred" should be inserted --presently--; line 64, "jackets" should read --jacket--. Col. 4, line 18, "unerlying" should read --underlying--; line 36, "a" first occurrence, should read --an--; line 63, "passage" should be deleted; line 64, the entire line should be deleted. Col. 6, line 16, "closed" should read --enclosed--.

Signed and Sealed this

Twenty-eighth Day of February 1978

[SEAL]

Attest:

RUTH C. MASON
*Attesting Officer*

LUTRELLE F. PARKER
*Acting Commissioner of Patents and Trademarks*